(12) United States Patent
Takami

(10) Patent No.: US 6,385,291 B1
(45) Date of Patent: May 7, 2002

(54) X-RAY LENS AND METHOD OF MANUFACTURING X-RAY LENS

(75) Inventor: Tomohide Takami, Tokyo (JP)

(73) Assignee: Vision Arts LTD, Tokyo (JP)

( * ) Notice: Subject to any disclaimer, the term of this patent is extended or adjusted under 35 U.S.C. 154(b) by 0 days.

(21) Appl. No.: 09/740,232

(22) Filed: Dec. 18, 2000

(30) Foreign Application Priority Data

Oct. 18, 2000 (JP) ........................................ 2000-318023

(51) Int. Cl.$^7$ ................................................. G21K 1/06
(52) U.S. Cl. ......................................... 378/84; 378/145
(58) Field of Search ........................... 378/84, 85, 145, 378/82, 43; 385/54

(56) References Cited

U.S. PATENT DOCUMENTS 5,192,869 A * 3/1993 Kumakhov .................. 378/84
5,276,724 A * 1/1994 Kumasaka et al. .......... 378/161
5,594,773 A   1/1997 Tomie ........................ 378/145

* cited by examiner

Primary Examiner—Drew Dunn
(74) Attorney, Agent, or Firm—Brown & Michaels, PC

(57) ABSTRACT

A method of manufacturing X-ray lenses which transmit X-rays which has a first step of providing a layer of liquid on the flat surface of a first substrate, a second step of arranging numerous pipe-shaped lens components in a row following an axis which extends parallel to the flat surface in the layer of liquid, and a third step of holding the pipe-shaped lens components between the surface of a second substrate having a flat surface and the flat surface of the first substrate, and filling the liquid in spaces formed by the exterior surface of the pipe-shaped lens components and the flat surface of the first substrate or the flat surface of the second substrate. The pipe-shaped lens components can be carbon nanotubes, and the liquid can be a mixture of a solvent and a lubricant such as silicon grease which has had its viscosity reduced.

6 Claims, 3 Drawing Sheets

PRIOR ART

X-RAY LENS AND METHOD OF MANUFACTURING X-RAY LENS

BACKGROUND OF THE INVENTION

1. Field of the Invention

The invention pertains to the field of X-ray lenses. More particularly, the invention pertains to a method of manufacturing transmission type X-ray lenses, particularly a method of manufacturing short focus lenses.

2. Description of Related Art

While it is well known that the reflectance of X-rays compared to their transmission is very small, prior art X-ray lenses, used reflecting type which used Bragg reflection from many layers despite the low intensity of the focused X-ray.

This is due to the fact that $n=1-\delta (\delta <0.001)$, if n is the refraction factor of X-rays. That is to say, because it is only slightly less than 1, X-rays for the most part do not refract. Because of that it has been extremely difficult to manufacture X-ray transmission lenses at a practical level with the same method as when dealing with visible light.

A transmission type lens different from that for visible light was disclosed as a transmission type lens for use with X-rays in Japanese Patent 2526409 (U.S. Pat. No. 5,594,773). A summary of that invention is shown in FIG. 3. This invention has numerous cylindrically shaped boring holes 32 cut in a lens material component 31 and these boring holes 32 are lined up following a specified axis. Then, when this X-ray lens is used, the X-ray incidence direction 33 is the direction that boring holes 32 are lined up.

As previously noted, in a transmission type X-ray lens which converges X-rays at a short focal length, in order to converge incident X-rays of an order of a nanometer or less at a practical focal length, the required diameter of cylindrically shaped boring holes 32 is an order of several nm and processing of their curved surfaces is extremely difficult. In addition, lining up the numerous cylindrically shaped bored holes 32 forming a parallel line following the specified axis which becomes the X-ray incidence angle 33 must be done very precisely. The inventor has formed boring holes like these in a diamond with machine processing and tried manufacturing this transmission type X-ray lens but there were extreme technical problems and this had to be abandoned.

In addition, it was acknowledged that the material qualities of metal would significantly change in an order of several nm, as seen, for example, in the phenomenon of the melting point of gold significantly lowering.

The present invention, in proposing to shorten the focal length in X-ray lenses, departs from idea of cutting cylindrically shaped holes in lens materials and takes as its purpose to provide a method of manufacturing transmission type X-ray lenses which does not require highly complex precision processing and will provide transmission type X-ray lenses with comparatively short focal lengths easily.

SUMMARY OF THE INVENTION

The present invention, in order to solve the previously noted problems, provides a method of manufacturing X-ray lenses which transmit X-rays comprising a first step of providing a layer of liquid on the flat surface of a first substrate, a second step of arranging numerous pipe-shaped lens components in a row following an axis which extends parallel to the flat surface in the layer of liquid, and a third step of holding the pipe-shaped lens components between the surface of a second substrate having a flat surface and the flat surface of the first substrate, and filling the liquid in spaces formed by the exterior surface of the pipe-shaped lens components and the flat surface of the first substrate or the flat surface of the second substrate.

By adopting the previously noted method, pipe-shaped lens components can be precisely lined up easily following a specified axis without requiring high technical precision seen from the aspect of commercial production and without being affected by the size of the pipe-shaped lens components.

In one embodiment of the invention, the second step arranges carbon nanotubes as the pipe-shaped lens components. The carbon nanotube referred to here is a nanometer ($10^{-9}$ m) order tube formed by three arms of carbon atoms tied together. What should be noted about the structure of this carbon nanotube is that it has a nanoscale thickness, it is pipe-shaped and that generally a six membered ring is arranged in a helical shape.

In the past carbon nanotubes have been noted for their conductivity and their utilization in computer wiring and electronic devices. By using these carbon nanotubes as structural material for X-ray lenses a method of manufacturing X-ray lenses that can refract incident X-rays of a nanometer order or less at levels where short focusing is possible can be offered.

Another embodiment of the invention includes a liquid which holds the pipe-shaped lens components and a pair of substrates which holds the liquid and numerous the pipe-shaped lens components, whereby surfaces facing the pipe-shaped lens components of the pair of substrates are both flat and the pipe-shaped lens components are lined up following the same direction.

By adopting this configuration a transmitted X-ray is gradually refracted and can be made to converge because numerous pipe-shaped lens components artificially configure numerous concave lenses. These pipe-shaped lens components can be carbon nanotubes. By using these carbon nanotubes, X-ray lenses that can refract incident X-rays of a nanometer order or less at levels where short focusing is possible can be offered.

BRIEF DESCRIPTION OF THE DRAWING

FIG. 1b shows a horizontal cross section of the transmission type X-ray lens shown in FIG. 1a.

DETAILED DESCRIPTION OF THE INVENTION

Figure 1A:
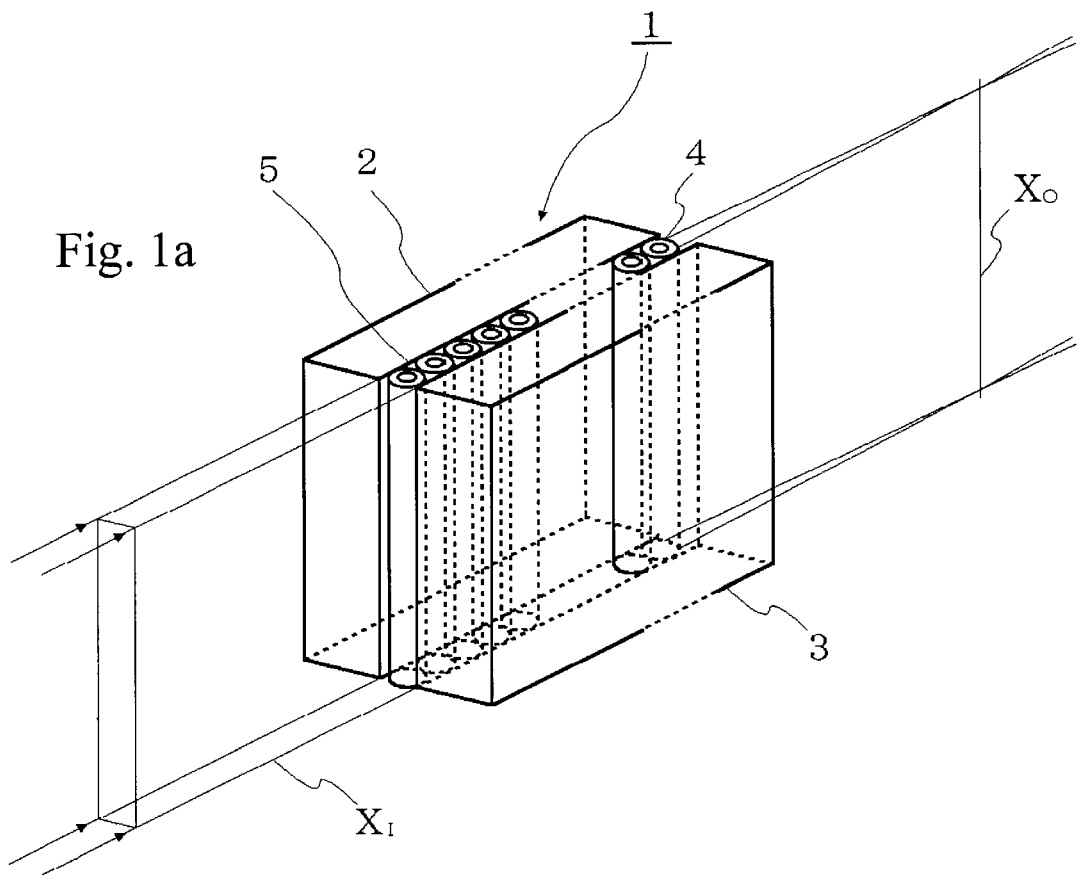
FIG. 1a is an oblique view schematic drawing showing the transmission type X-ray lens of an embodiment of the present invention.
Figure 1B:
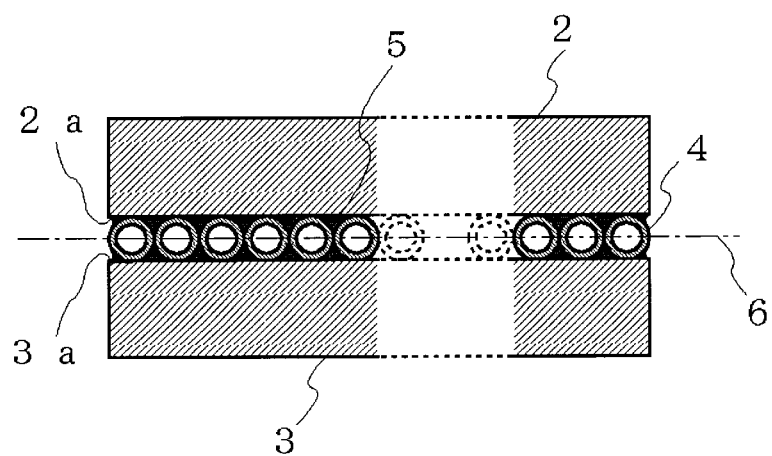

The following description explains the transmission type X-ray lens as an embodiment of the present invention using FIGS. 1a and 1b. FIG. 1a is an oblique view schematic drawing showing the transmission type X-ray lens of an embodiment of the present invention. FIG. 1b is a horizontal cross section drawing showing the internal structure of the transmission type X-ray lens shown in FIG. 1a. In FIGS. 1a and 1b, 2 is first substrate, 3 is second substrate, 4 is a pipe-shaped lens component and 5 is a liquid.

Substrate 2 and substrate 3 are processed in advance so that one face is a flat surface. Such things as silicon wafers (Si wafer) etc. may be used for the materials for substrate 2 and substrate 3.

The structure of the pipe-shaped component 4 used shall have a cylindrically formed shape at least in the area that X-rays are irradiated. In this embodiment a carbon nanotube was used. A carbon nanotube can be made a diameter of several nm and a length of several μm ($10^{-9}$ m) by growing on a silicon carbide (SiC) substrate and if arc discharging is used, a carbon nanotube bundle of a length of several hundred μm can be synthesized.

The liquid 5 shown in FIG. 1b, is preferably one which has little X-ray absorption as well as one which causes little damage such as scattering of X-rays. Specifically, an appropriate liquid might be something such as a lubricating fluid, such as silicon grease which has had its viscosity reduced by addition of a solvent.

In this embodiment, flat face 2a of substrate 2 and flat face 3a of substrate 3 are disposed so they are opposite and these flat faces 2a of substrate 2 and 3a of substrate 3 each contact the outer face of the side of pipe-shaped lens component 2.

Because the pipe-shaped lens component 4 of this embodiment has a diameter the order of a nanometer as was described earlier, the width of the spaces formed by flat face 2a, flat face 3a and the exterior face of pipe-shaped lens component 2 are of the same order and are narrow and be called gaps. Because liquid 5 is filled in this gap, the separation of flat face 2a, flat face 3a and the exterior face of pipe-shaped lens component 2 and liquid 5 is suppressed by the adhesive power of liquid 5.

That is to say, because liquid 5 functions like a glue due to its fluidity and adhesive power, when pipe-shaped lens component 4 is contacting an adjacent pipe-shaped lens component 4 so that they are as close as possible, the flat face 2a of substrate 2 and the exterior face of the adjacent pipe-shaped lens component 4 are in a state of being stuck together by liquid 5. Similarly, the flat face 3a of substrate 3 which is in a position opposite to this and the exterior face of the adjacent pipe-shaped lens component 4 are also in a state of being stuck together by liquid 5.

As explained above, due to the reciprocal mechanism of the gap formed by the respective components and liquid 5, transmission type X-ray lens 1 which is a structure which holds numerous pipe-shaped lens components 4 between substrate 2 and substrate 3 is structurally stable. In addition, since numerous pipe-shaped lens components 4 are arranged so that they contact flat surface 2a of substrate 2 and flat surface 3a of substrate 3, flat surface 2a and flat surface 3a fulfill the role of positioning pipe-shaped lens components 4.

Because of this, the center of pipe-shaped lens components 4 can be precisely aligned on the axis 6 of an X-ray lens upon which X-rays will be incident.

The degree of flatness such as the surface roughness required in flat face 2a of substrate 2 and flat face 3a of substrate 3 is determined by the properties of the X-rays incident, such as wave length and such things as the tolerance of the previously noted axis 6 and the center of the pipe-shaped lens component 4. For example, when using carbon nanotubes for pipe-shaped lens component 4, since the diameter is several nm, the side face of substrate 2 and substrate 3 would be mirror polished etc. and made a smooth surface so that they would fall within a tolerance of subnanometers or less.

By adopting a substrate with this configuration, while precision processing in manufacturing is required in making the surface roughness of the flat surfaces of the two substrates uniform, this can make manufacturing of transmission type X-ray lenses easier when compared with boring holes in a substrate and can better ensure the precision of the previously noted positioning.

X-rays are incident in the transmission type X-ray lens of the embodiment explained above centering on previously noted axis 6. As shown in FIG. 1a, X-ray $X_I$ is an X-ray which is incident upon transmission type X-ray lens 1, and is incident upon this transmission type X-ray lens from an X-ray source via a slit etc. Alignment of the direction of the incident X-ray with the axis of the transmission type X-ray lens is adjusted using a multi-axis staging device which is outfitted with a precision angle measuring instrument such as a goniometer.

Here the diameter of pipe-shaped lens components 4 and the length of the circular cross section area are set so that they will not be smaller than the width of incident X-ray $X_I$.

In addition, as previously noted, carbon nanotubes are used for the pipe-shaped lens components which transmit X-rays in this embodiment and these have a cylindrical shape where X-rays are transmitted. At this time air or a gas in the atmosphere when carbon nanotubes are synthesized may be in them or this may be an atmosphere that will not have an adverse influence on the X-rays that they will transmit such as an atmosphere with a low X-ray absorbing coefficient of the previously noted liquid 5. It does not matter whether the carbon nanotubes are single layered tubes or multi-layered tubes.

As explained earlier, in the present embodiment, by arranging pipe-shaped lens components 4 contiguous and parallel, a converging effect, the same as when numerous concave lenses have been arranged can be obtained, because the surface of the inner perimeter of pipe-shaped lens components 4 act artificially to fulfill the role of a concave lens (See FIG. 1b). Thus, X-ray $X_I$ which is incident, by successively passing through numerous pipe-shaped lens components and liquid 5 which holds these, because it gradually refracts, it ultimately converges and becomes X-ray $X_O$.

Here we have utilized a structure in which the carbon nanotubes which are pipe-shaped lens components 4 are arranged so that their outer peripheries contact each other, but it is not necessary to have carbon nanotubes fit tightly with other contiguous carbon nanotubes. It may also have a structure in which carbon nanotubes are contiguous via liquid 5.

Figure 2A:
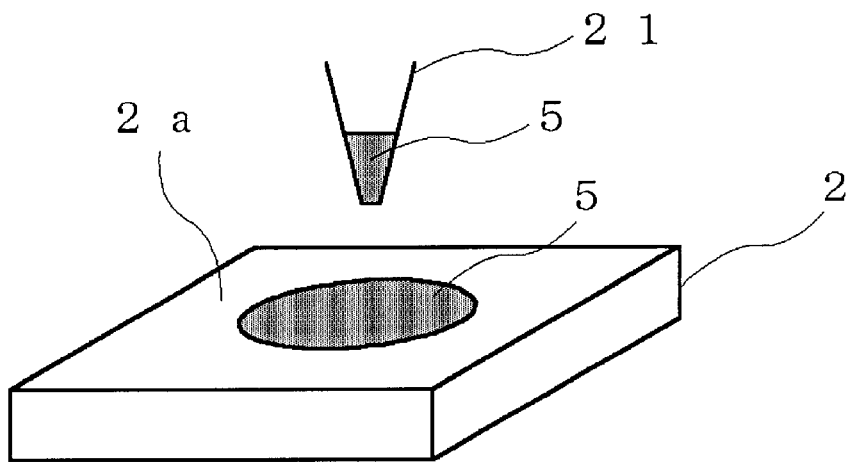
FIGS. 2a through 2c shows the steps in the method of manufacturing the transmission type X-ray lens of an embodiment of the present invention.
Figure 2B:
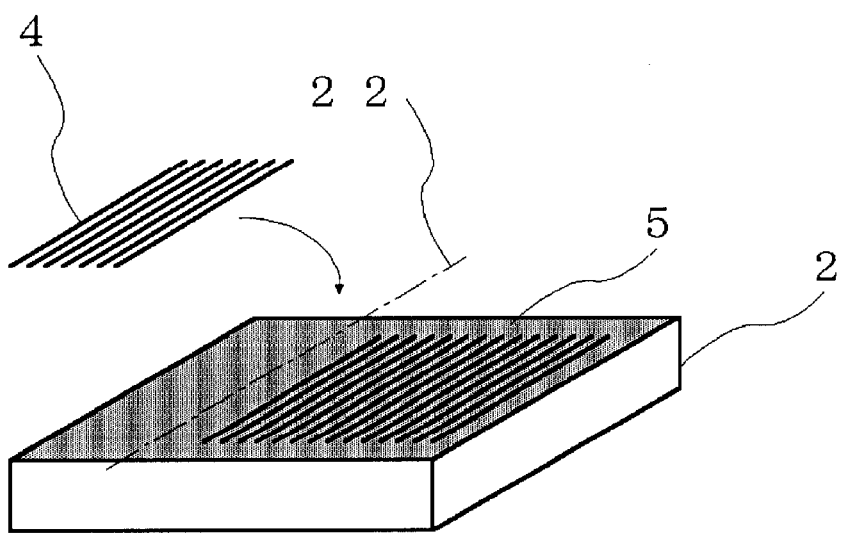
Figure 2C:
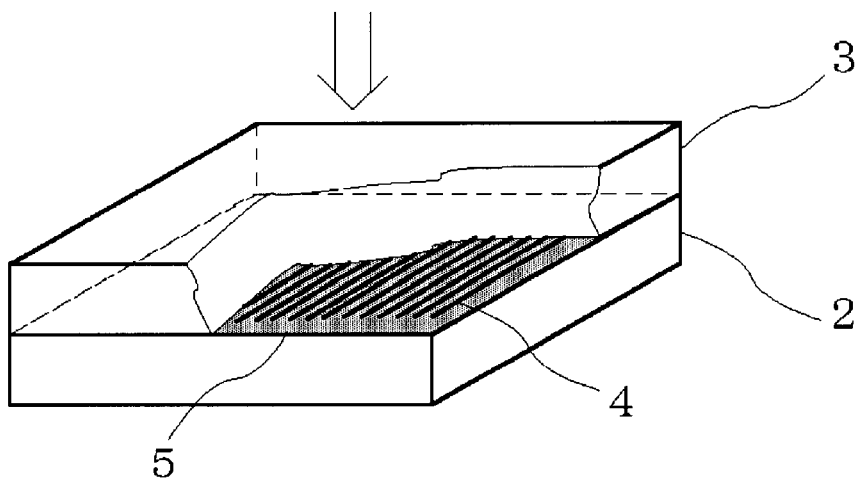
Figure 3:
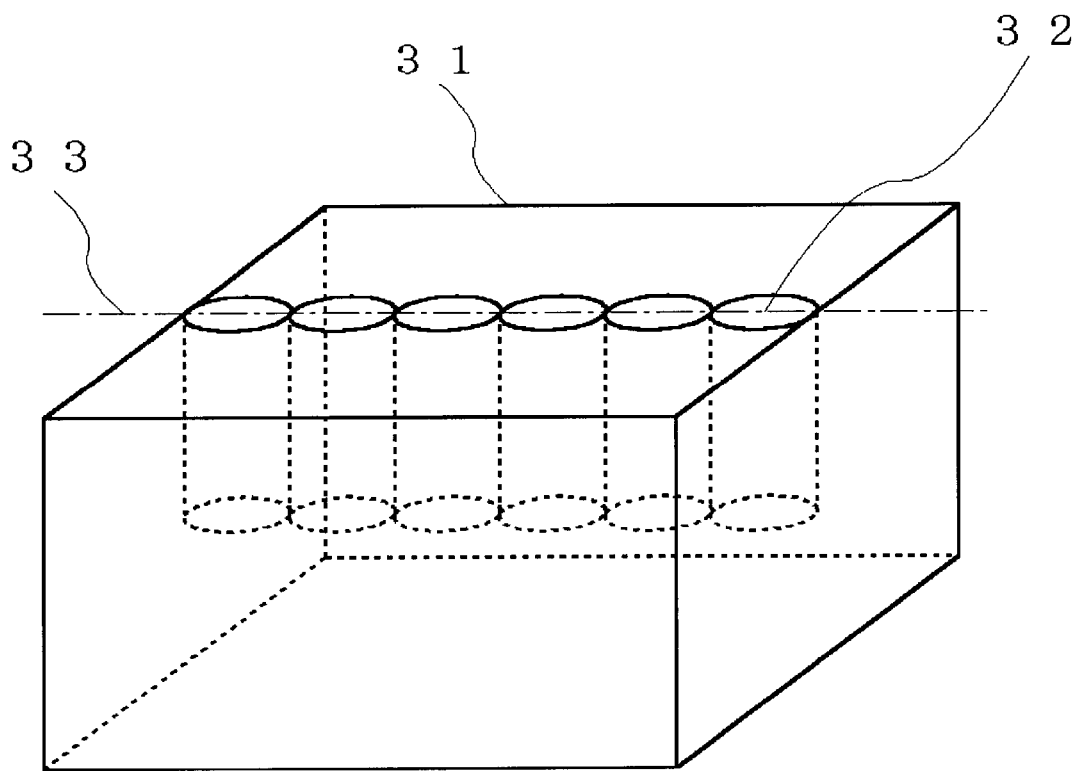
FIG. 3 shows a prior art transmission type X-ray lens.

Next, we shall explain the method of manufacturing the transmission type X-ray lens of an embodiment of this invention with FIGS. 2a through 2c, which are oblique view simplified drawings showing each of the manufacturing processes of the transmission type X-ray lens of this invention. Components with the same numbers as in FIGS. 1a and 1b have the same function in FIGS. 2a through 2c.

Beginning with FIG. 2a, a liquid layer is formed on substrate 2 with liquid 5. In this embodiment a liquid layer is formed by dripping liquid 5 on the flat surface 2a of this substrate 2 using dripping mechanism 21. Since it is sufficient if the liquid layer formed with liquid 5 covers a specified area on flat surface 2a, the mechanism for forming the liquid layer is not restricted to the method using dripping mechanism 21 and a layer may be formed using methods such as painting and spraying as well.

In addition, in this embodiment the liquid layer formed with liquid 5 has a configuration which forms it over the entire surface of flat surface 2a of substrate 2, since ultimately it is sufficient if liquid 5 fills the gaps formed by flat surface 2a, flat surface 3a and the exterior periphery of pipe-shaped lens components 2, it may be scattered over flat surface 2a.

Then, in FIG. 2b, numerous pipe-shaped lens components 4 are placed on substrate 2. After completing the process shown in FIG. 2a, pipe-shaped lens components 4 are successively placed on the liquid layer of liquid 5 formed in that process and made so that the pipe-shaped lens components are held by liquid 5. Here, pipe-shaped lens components 4 are respectively lined up and placed so that they follow the orienting axis 22 which extends in a direction parallel to the flat surface 2a of substrate 2. When the manufacturing process is fully completed and this is completed as an X-ray lens, the direction that axis 22 extends which is the standard when placing these will be perpendicular to the direction that X-rays are transmitted in the transmission type X-ray lens.

When placing pipe-shaped lens components 4 parallel, one may place them in a layer formed by liquid 5 in a state in which their exterior walls are contacting each other, or may use a method in which one places the pipe-shaped lens components 4 on the liquid layer with a slight gap between a pipe-shaped lens component 4 and another pipe-shaped lens component and subsequently relies on using the phenomenon of moving them with the surface tension of liquid 5 to make adjacent pipe-shaped lens components 4 contact each other.

In addition while the number of pipe-shaped lens components 4 which are placed is selected to correspond to the required focal length, as a general rule, as the number of pipe-shaped lens components 4 is increased, the focal length becomes smaller.

Then, in FIG. 2c, the pipe-shaped lens components 4 placed on substrate 2 are enclosed and held with substrate 3. After the process shown in FIG. 2b is completed, the flat face 2a of substrate 2 and the flat face 3a of substrate 3 are made to face each other and these flat surfaces 2a and 3a hold pipe-shaped lens component 4 between them, At this time liquid 5 fills up spaces and gaps formed by the flat surface 2a of flat surface 3a and pipe-shaped lens components 4 by capillary action, etc.

As previously noted, by liquid 5 filling up these gaps, the adhesive power of liquid 4 unifies substrate 2, substrate 3 and pipe-shaped lens component 4 and ensures and maintains structural stability.

This adjustment of the position of pipe-shaped lens components in the end of the X-ray lens that X-rays will be incident upon will be done using electron microscopes etc.

By adopting the method previously noted, even though the pipe-shaped lens components 4 are small diameter components like carbon nanotubes, precision processing required in manufacturing is accomplished easily because the lens components which refract X-rays are independent structures. In addition, while precision processing is required in making the surface of the substrates flat, because processing a flat surface compared to processing a curved surface can be accomplished with greater precision, precision processing required to line up numerous pipe-shaped lens components following a specific axis is accomplished with ease.

Moreover, by using the X-ray lenses manufactured using this method of manufacturing, the size of devices can be reduced together with shortening of the focal length and it becomes possible to realize X-ray electron microscopes that can be used practicably. By virtue of this, interfaces and internal structures which could not be observed with X-ray electron microscopes in the past can be observed at the electron level and we can expect these X-ray electron microscopes to be used in the field of medicine as well as in industry.

As previously explained, with the invention of claim one, short focal length X-ray lenses can be manufactured with realizable precision by adopting a process of first arranging tube shaped lens components on a substrate finished with a liquid layer and then holding them with a substrate.

In addition, with the invention of claim two, a practical method of manufacturing X-ray lenses which converge incident X-rays with precision in microscopic areas of the order of nanometers can be made available by adopting carbon nanotubes as tube shaped lens components.

Also with the invention of claim three, X-ray lenses with short focal lengths can be made available by holding tube shaped lens components placed parallel with substrates and adopting a configuration in which tube shaped lens components are held between the substrates by a liquid.

Finally with the invention of claim four, practical X-ray lenses which converge incident X-rays in microscopic areas of the order of nanometers can be made available by adopting carbon nanotubes as tube shaped lens components.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

| Table of Reference Numbers | |
|---|---|
| 1 | transmission type X-ray lens |
| 2 | substrate |
| 2a | flat surface of substrate 1 |
| 5 | substrate |
| 3a | flat surface of substrate 3 |
| 2 | pipe-shaped lens component [translator's note: this appears to be a typo and should be "4". The same typo appears once in the text. Otherwise this is always referred to with a "4".] |
| 5 | liquid |
| 6 | axis of sliding X-ray lens |
| 21 | dripping mechanism |
| 22 | axis |
| 31 | lens material component |
| 32 | boring hole |
| 33 | X-ray incidence direction |

What is claimed is:

1. A method of manufacturing X-ray lenses comprising the steps of:

a) providing a layer of liquid on a flat surface of a first substrate, b) arranging a plurality of pipe-shaped lens components in a row following an axis which extends parallel to said flat surface in said layer of liquid; and c) holding said pipe-shaped lens components between a flat surface of a second substrate and the flat surface of said first substrate, such that said liquid fills in spaces formed by an exterior surface of said pipe-shaped lens components and the flat surface of said first substrate or the flat surface of said second substrate.

2. The method of claim 1, in which the pipe-shaped lens components are carbon nanotubes.

3. The method of claim 1, in which the liquid is silicon grease having a viscosity reduced by addition of a solvent.

4. An X-ray lens comprising:
a) a plurality of pipe-shaped lens components which transmit X-rays,
b) a liquid which holds said pipe-shaped lens components and
c) a pair of substrates for holding said liquid and said plurality of pipe-shaped lens components, each having a flat surface facing said pipe-shaped lens components, and said pipe-shaped lens components are lined up following a same direction.

5. The X-ray lens of claim 4, wherein said pipe-shaped lens components are carbon nanotubes.

6. The X-ray lens of claim 4, in which the liquid is silicon grease having a viscosity reduced by addition of a solvent.

* * * * *